(12) United States Patent
Alattar

(10) Patent No.: US 7,050,201 B2
(45) Date of Patent: May 23, 2006

(54) METHOD AND APPARATUS FOR ENCODING PAPER WITH INFORMATION

(75) Inventor: Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 330 days.

(21) Appl. No.: 10/642,451

(22) Filed: Aug. 14, 2003

(65) Prior Publication Data

US 2004/0131225 A1  Jul. 8, 2004

Related U.S. Application Data

(63) Continuation of application No. 09/515,545, filed on Feb. 29, 2000, now Pat. No. 6,608,919, which is a continuation-in-part of application No. 09/437,357, filed on Nov. 10, 1999, now abandoned.

(51) Int. Cl.
   *G41M 3/10*     (2006.01)
   *G06K 19/06*    (2006.01)
   *G06T 7/60*     (2006.01)

(52) U.S. Cl. .............. 358/3.28; 382/100; 382/289; 358/488; 283/113; 235/494

(58) Field of Classification Search .......... 358/3.28, 358/1.9, 1.11, 470, 488; 382/100, 287, 289–292; 235/494; 283/113
See application file for complete search history.

(56) References Cited

U.S. PATENT DOCUMENTS

| | | |
|---|---|---|
| 3,569,619 A | 3/1971 | Simjian |
| 3,984,624 A | 10/1976 | Waggener |
| 4,230,990 A | 10/1980 | Lert, Jr. et al. |
| 4,234,214 A | 11/1980 | Lee |
| 4,238,849 A | 12/1980 | Gassmann |
| 4,296,326 A | 10/1981 | Haslop et al. |
| 4,297,729 A | 10/1981 | Steynor et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,425,642 A | 1/1984 | Moses et al. |
| 4,528,588 A | 7/1985 | Lofberg |
| 4,547,804 A | 10/1985 | Greenberg |
| 4,618,257 A | 10/1986 | Bayne et al. |
| 4,672,605 A | 6/1987 | Hustig et al. |
| 4,675,746 A | 6/1987 | Tetrick et al. |
| 4,682,540 A | 7/1987 | Eastman et al. |

(Continued)

FOREIGN PATENT DOCUMENTS

CA       2235002       12/1998

(Continued)

OTHER PUBLICATIONS

U.S. Appl. No. 60/000,442, filed Jun. 20, 1995, Hudetz.

(Continued)

*Primary Examiner*—Scott A. Rogers
(74) *Attorney, Agent, or Firm*—Digimarc Corporation

(57) ABSTRACT

Paper is textured with a pattern that yields a known signature signal when transformed to the frequency domain. This signature can be used for various purposes, including determining the angular orientation of the paper when scanned, conveying a plural-bit digital watermark, and for simple document recognition purposes (e.g., photocopiers that refuse to reproduce banknotes). The texturing can be effected during the paper-making process, e.g., by shaping the surface of a de-watering element accordingly.

12 Claims, 1 Drawing Sheet

U.S. PATENT DOCUMENTS

| | | |
|---|---|---|
| 4,739,377 A | 4/1988 | Allen |
| 4,750,173 A | 6/1988 | Bluthgen |
| 4,807,031 A | 2/1989 | Broughton et al. |
| 4,855,827 A | 8/1989 | Best |
| 4,879,747 A | 11/1989 | Leighton et al. |
| 4,888,798 A | 12/1989 | Earnest |
| 4,908,836 A | 3/1990 | Rushforth et al. |
| 4,908,873 A | 3/1990 | Philibert et al. |
| 4,910,688 A | 3/1990 | Amini |
| 4,944,036 A | 7/1990 | Hyatt |
| 4,947,028 A | 8/1990 | Gorog |
| 4,968,386 A | 11/1990 | Nguyen |
| 4,969,041 A | 11/1990 | O'Grady et al. |
| 4,971,646 A | 11/1990 | Schell et al. |
| 4,972,476 A | 11/1990 | Nathans |
| 4,977,594 A | 12/1990 | Shear |
| 5,023,907 A | 6/1991 | Johnson |
| 5,027,401 A | 6/1991 | Soltesz |
| 5,040,059 A | 8/1991 | Leberl |
| 5,053,956 A | 10/1991 | Donald |
| 5,062,666 A | 11/1991 | Mowry et al. |
| 5,094,718 A | 3/1992 | Friend |
| 5,095,196 A | 3/1992 | Miyata |
| 5,103,459 A | 4/1992 | Gilhousen et al. |
| 5,113,445 A | 5/1992 | Wang |
| 5,146,457 A | 9/1992 | Veldhuis et al. |
| 5,181,786 A | 1/1993 | Hujink |
| 5,200,822 A | 4/1993 | Bronfin et al. |
| 5,213,337 A | 5/1993 | Sherman |
| 5,216,724 A | 6/1993 | Suzuki et al. |
| 5,243,423 A | 9/1993 | DeJean et al. |
| 5,259,025 A | 11/1993 | Monroe |
| 5,280,537 A | 1/1994 | Sugiyama et al. |
| 5,288,976 A | 2/1994 | Citron |
| 5,291,243 A | 3/1994 | Heckman et al. |
| 5,295,203 A | 3/1994 | Krause et al. |
| 5,315,098 A | 5/1994 | Tow |
| 5,321,470 A | 6/1994 | Hasuo et al. |
| 5,374,976 A | 12/1994 | Spannenburg |
| 5,379,345 A | 1/1995 | Greenberg |
| 5,416,307 A | 5/1995 | Danek et al. |
| 5,428,607 A | 6/1995 | Hiller et al. |
| 5,428,731 A | 6/1995 | Powers |
| 5,449,200 A | 9/1995 | Andric et al. |
| 5,463,209 A | 10/1995 | Figh |
| 5,469,222 A | 11/1995 | Sprague |
| 5,469,506 A | 11/1995 | Berson et al. |
| 5,493,677 A | 2/1996 | Balogh |
| 5,495,581 A | 2/1996 | Tsai |
| 5,496,071 A | 3/1996 | Walsh |
| 5,502,576 A | 3/1996 | Ramsay et al. |
| 5,521,722 A | 5/1996 | Colvill et al. |
| 5,524,933 A | 6/1996 | Kunt et al. |
| 5,530,759 A | 6/1996 | Braudaway et al. |
| 5,530,852 A | 6/1996 | Meske, Jr. et al. |
| 5,568,550 A | 10/1996 | Ur |
| 5,583,614 A | 12/1996 | Hasuo |
| 5,583,639 A | 12/1996 | Hasuo |
| 5,583,950 A | 12/1996 | Prokoski |
| 5,594,226 A | 1/1997 | Steger |
| 5,598,526 A | 1/1997 | Daniel et al. |
| 5,613,004 A | 3/1997 | Cooperman et al. |
| 5,617,119 A | 4/1997 | Briggs et al. |
| 5,636,292 A | 6/1997 | Rhoads |
| 5,638,443 A | 6/1997 | Stefik |
| 5,640,193 A | 6/1997 | Wellner |
| 5,646,999 A | 7/1997 | Saito |
| 5,652,626 A | 7/1997 | Kawakami et al. |
| 5,659,164 A | 8/1997 | Schmid |
| 5,663,766 A | 9/1997 | Sizer, II |
| 5,664,018 A | 9/1997 | Leighton |
| 5,665,951 A | 9/1997 | Newman et al. |
| 5,668,636 A | 9/1997 | Beach et al. |
| 5,671,282 A | 9/1997 | Wolff et al. |
| 5,673,316 A | 9/1997 | Auerbach et al. |
| 5,687,236 A | 11/1997 | Moskowitz et al. |
| 5,710,636 A | 1/1998 | Curry |
| 5,719,939 A | 2/1998 | Tel |
| 5,721,788 A | 2/1998 | Powell et al. |
| 5,727,092 A | 3/1998 | Sandford, II et al. |
| 5,735,547 A | 4/1998 | Morelle et al. |
| 5,740,244 A | 4/1998 | Indeck et al. |
| 5,740,276 A | 4/1998 | Tomko et al. |
| 5,742,845 A | 4/1998 | Wagner |
| 5,745,604 A | 4/1998 | Rhoads |
| 5,761,686 A | 6/1998 | Bloomberg |
| 5,768,426 A | 6/1998 | Rhoads |
| 5,778,102 A | 7/1998 | Sandford, II et al. |
| 5,790,693 A | 8/1998 | Graves et al. |
| 5,790,697 A | 8/1998 | Munro et al. |
| 5,804,803 A | 9/1998 | Cragun et al. |
| 5,809,160 A | 9/1998 | Powell et al. |
| 5,809,317 A | 9/1998 | Kogan et al. |
| 5,815,198 A | 9/1998 | Vachtsevanos et al. |
| 5,817,205 A | 10/1998 | Kaule |
| 5,818,441 A | 10/1998 | Throckmorton et al. |
| 5,819,289 A | 10/1998 | Sanford, II et al. |
| 5,822,436 A | 10/1998 | Rhoads |
| 5,825,871 A | 10/1998 | Mark |
| 5,825,892 A | 10/1998 | Braudaway et al. |
| 5,835,639 A | 11/1998 | Honsinger et al. |
| 5,838,458 A | 11/1998 | Tsai |
| 5,841,978 A | 11/1998 | Rhoads |
| 5,848,144 A | 12/1998 | Ahrens |
| 5,848,413 A | 12/1998 | Wolff |
| 5,850,481 A | 12/1998 | Rhoads |
| 5,852,673 A | 12/1998 | Young |
| 5,857,038 A | 1/1999 | Owada et al. |
| 5,862,218 A | 1/1999 | Steinberg |
| 5,862,260 A | 1/1999 | Rhoads |
| 5,869,819 A | 2/1999 | Knowles et al. |
| 5,871,615 A | 2/1999 | Harris |
| 5,872,589 A | 2/1999 | Morales |
| 5,875,249 A | 2/1999 | Mintzer et al. |
| 5,893,101 A | 4/1999 | Balogh et al. |
| 5,898,779 A | 4/1999 | Squilla et al. |
| 5,900,608 A | 5/1999 | Iida |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,905,810 A | 5/1999 | Jones et al. |
| 5,912,972 A | 6/1999 | Barton |
| 5,913,210 A | 6/1999 | Call |
| 5,915,027 A | 6/1999 | Cox et al. |
| 5,930,767 A | 7/1999 | Reber et al. |
| 5,932,863 A | 8/1999 | Rathus et al. |
| 5,933,798 A | 8/1999 | Linnartz |
| 5,933,829 A | 8/1999 | Durst et al. |
| 5,938,726 A | 8/1999 | Reber et al. |
| 5,938,727 A | 8/1999 | Ikeda |
| 5,939,695 A | 8/1999 | Nelson |
| 5,940,595 A | 8/1999 | Reber et al. |
| 5,949,055 A | 9/1999 | Fleet et al. |
| 5,950,173 A | 9/1999 | Perkowski |
| 5,963,916 A | 10/1999 | Kaplan |
| 5,971,277 A | 10/1999 | Cragun et al. |
| 5,974,141 A | 10/1999 | Saito |
| 5,974,548 A | 10/1999 | Adams |
| 5,978,773 A | 11/1999 | Hudetz et al. |
| 5,979,757 A | 11/1999 | Tracy et al. |
| 5,983,218 A | 11/1999 | Syeda-Mahmood |
| 5,991,426 A | 11/1999 | Cox et al. |
| 6,005,501 A | 12/1999 | Wolosewicz |

| | | | |
|---|---|---|---|
| 6,035,177 A | 3/2000 | Moses et al. | |
| 6,052,486 A | 4/2000 | Knowlton et al. | |
| 6,064,764 A | 5/2000 | Bhaskaran et al. | |
| 6,122,403 A | 9/2000 | Rhoads | |
| 6,324,574 B1 | 9/2000 | Rhoads | |
| 6,166,750 A | 12/2000 | Negishi | |
| 6,200,419 B1 | 3/2001 | Phan | |
| 6,252,963 B1 | 6/2001 | Rhoads | |
| 6,266,430 B1 | 7/2001 | Rhoads et al. | |
| 6,282,300 B1 | 8/2001 | Bloom et al. | |
| 6,285,776 B1 | 9/2001 | Rhoads | |
| 6,311,214 B1 | 10/2001 | Rhoads | |
| 6,321,648 B1 | 11/2001 | Berson et al. | |
| 6,334,678 B1 | 1/2002 | Daigneault et al. | |
| 6,343,138 B1 | 1/2002 | Rhoads | |
| 6,345,104 B1 | 2/2002 | Rhoads | |
| 6,385,329 B1 * | 5/2002 | Sharma et al. | 382/100 |
| 6,385,330 B1 | 5/2002 | Powell et al. | |
| 6,427,020 B1 | 7/2002 | Rhoads | |
| 6,449,377 B1 | 9/2002 | Rhoads | |
| 6,505,160 B1 | 1/2003 | Levy et al. | |
| 6,512,837 B1 | 1/2003 | Ahmed | |
| 6,522,770 B1 | 2/2003 | Seder et al. | |
| 6,522,771 B1 | 2/2003 | Rhoads | |
| 6,549,638 B1 | 4/2003 | Davis et al. | |
| 6,574,350 B1 | 6/2003 | Rhoads et al. | |
| 6,577,746 B1 | 6/2003 | Evans et al. | |
| 6,580,819 B1 | 6/2003 | Rhoads | |
| 6,650,761 B1 | 11/2003 | Rodriguez et al. | |
| 6,674,886 B1 | 1/2004 | Davis et al. | |
| 6,683,966 B1 | 1/2004 | Tian et al. | |
| 6,694,041 B1 | 2/2004 | Brunk | |
| 6,959,385 B1 * | 10/2005 | Murakami et al. | 713/176 |
| 2001/0026377 A1 | 10/2001 | Ikegami | |
| 2001/0042052 A1 | 11/2001 | Leon | |
| 2001/0055258 A1 | 12/2001 | Carson et al. | |
| 2002/0009208 A1 | 1/2002 | Alattar et al. | |
| 2002/0032864 A1 | 3/2002 | Rhoads et al. | |

FOREIGN PATENT DOCUMENTS

| | | |
|---|---|---|
| DE | 29433436 | 5/1981 |
| EP | 493 091 | 7/1992 |
| EP | 0789480 | 8/1997 |
| EP | 872995 | 10/1998 |
| EP | 0642060 | 4/1999 |
| EP | 1147495 | 10/2001 |
| WO | WO94/27228 | 11/1994 |
| WO | WO95/04665 | 2/1995 |
| WO | WO95/10813 | 4/1995 |
| WO | WO97/43736 | 11/1997 |
| WO | WO98/14887 | 4/1998 |
| WO | WO98/20642 | 5/1998 |
| WO | WO98/24050 | 6/1998 |
| WO | WO98/40823 | 9/1998 |
| WO | WO98/49813 | 11/1998 |
| WO | WO99/34277 | 7/1999 |
| WO | WO99/36876 | 7/1999 |
| WO | WO00/44131 | 7/2000 |
| WO | WO 01/80169 | 10/2001 |

OTHER PUBLICATIONS

U.S. Appl. No. 60/071,983, filed Jan. 20, 1998, Levy.
U.S. Appl. No. 60/082,228, filed Apr. 16, 1998, Rhoads.
U.S. Appl. No. 60/114,725, filed Dec. 31 1998, Levy.
U.S. Appl. No. 60/116,641, filed Jan. 21, 1999, Cookson.
U.S. Appl. No. 60/314,648, filed May 19, 1999, Rodriguez et al.
U.S. Appl. No. 60/141,763, filed Jun. 30, 1999, Davis.
U.S. Appl. No. 60/158,015, filed Oct. 6, 1999, Davis et al.
U.S. Appl. No. 60/198,138, filed Apr. 17, 2000, Alattar.
U.S. Appl. No. 09/234,780, filed Jan. 20, 1999, Rhoads et al.
U.S. Appl. No. 09/292,569, filed Apr. 15, 1999, Rhoads et al.
U.S. Appl. No. 09/343,104, filed Jun. 29, 1999, Rodriguez et al.
U.S. Appl. No. 09/404,291, filed Sep. 23, 1999, Levy.
U.S. Appl. No. 09/437,357, filed Nov. 10, 1999, Alattar.
U.S. Appl. No. 09/452,021, filed Nov. 30, 1999, Davis et al.
U.S. Appl. No. 09/452,021, filed Nov. 30, 1999, Rhoads et al.
U.S. Appl. No. 09/465,418, filed Dec. 16, 1999, Rhoads et al.
U.S. Appl. No. 09/478,713, filed Jan. 6, 2000, Cookson.
U.S. Appl. No. 09/547,644, filed Apr. 12, 2000, Rhoads et al.
U.S. Appl. No. 09/562,517, filed May 1, 2000, Davis et al.
U.S. Appl. No. 09/562,524, filed May 1, 2000, Carr et al.
U.S. Appl. No. 09/567,405, filed May 8, 2000, Rhoads et al.
U.S. Appl. No. 09/571,422, filed May 15, 2000, Rhoads et al.
U.S. Appl. No. 09/574,726, filed May 18, 2000, Rhoads et al.
U.S. Appl. No. 09/619,264, filed Jul. 19, 2000, Kumar.
U.S. Appl. No. 09/625,577, filed Jul. 25, 2000, Carr et al.
U.S. Appl. No. 09/631,409, filed Aug. 3, 2000, Brundage et al.
U.S. Appl. No. 09/645,779, filed Aug. 24, 2000, Tian et al.
U.S. Appl. No. 09/670,115, filed Sep. 26, 2000, Rhoads et al.
U.S. Appl. No. 09/679,261, filed Oct. 4, 2000, Davis et al.
U.S. Appl. No. 09/761,349, filed Jan. 16, 2001, Rhoads.
U.S. Appl. No. 09/765,102, filed Jan. 17, 2001, Shaw.
Audio Watermarking Architectures for Secure Digital Music Distribution, A Proposal to the SDMI Portable Devices Working Group by ARIS Technologies, Inc, Mar. 26, 1999, pp. 1-11.
Audio Watermarking Architectures for Persistent Protection, Presentation to SDMI PDWG, Mar. 29, 1999, J. Winograd, Aris Technologies, pp. 1-16.
Audio Watermarking System to Screen Digital Audio Content for LCM Acceptance, A Proposal Submitted in Response to PDWG9905054-Transition C.function.P by ARIS Technologies, Inc., May 23, 1999, Document Version 1.0, 15 pages.
Boland et al., "Watermarking Digital Images for Copyright Protection", Fifth Int'l Conference on Image Processing and it's Application, Jul. 1995, pp. 326-330.
Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.
Bruckstein, A.M.; Richardson, T.J., A holographic transform domain image watermarking method, Circuits, Systems, and Signal Processing vol. 17, No. 3 p. 361-389, 1998. This paper includes an appendix containing an internal memo of Bell Labs, which according to the authors of the paper, was dated Sep. 1994.
Cookson, Chris, General Principles of Music Uses on Portable Devices, presented to SDMI, Mar. 5, 1999.
Dautzenberg, "Watermarking Images," Department of Microelectronics and Electrical Engineering, Trinity College Dublin, 47 pages, Oct. 1994.
Frequently Asked Questions About Digimarc Signature Technology, http://www.digimarc.com, Aug. 1995, 9 pages.
"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20-22, 1995, 4 pages.

Kurak et al., "A Cautionary Note On Image Downgrading," 1992 IEEE, pp. 153-159.

Levy, "AIPL's Proposal for SDMI: An Underlying Security System" (slide presentation), Mar. 29, 1999, 23 slides.

Microsoft Response to C.function.P for Technology Solutions to Screen Digital Audio Content for LCM Acceptance, SDMI, PDWG Tokyo, May 23, 1999, 9 pages.

Mintzer et al., "Safeguarding Digital library Contents and Users Digital Watermarking," D-Lib Magazine, Dec. 1997: ISSN 1082-9873.

O'Ruanaidh et al., "Rotation, Scale and translation Invariant Digital Image Watermarking," Int. Conf. on Image Proc., Oct. 1997 *IEEE, pp. 536-539.

Response to C.function.P for Technology Solutions to Screen Digital Audio Content for LCM Acceptance, NTT Waveless Radio Consotium, May 23, 1999, 9 pages.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Sandford II et al., "The Data Embedding Method", Proceedings of the SPIE vol. 2615, pp. 226-259, 1996.

Schreiber et al., "A Compatible High-Definition Television System Using the Noise-Margin Method of Hiding Enhancement Information," SMPTE Journal, Dec. 1989, pp. 873-879.

SDMI Example Use Scenarios (Non-Exhaustive), Version 1.2, Jun. 16, 1999.

Szepanski, "Additive Binary Data Transmission for Video Signals," Papers Presented at Conf. Of Comm. Engineering Soc. Sep. 30-Oct. 3, 1980, Technical Reports vol. 74, pp. 342-352.

Szepanski, W., "A Signal Theoretic Method For Creating Forgery-Proof Documents for Automatic Verification", 1979 Carnahan Conference on Crime Countermeasures, May 16-18, 1979, pp. 101-109.

Tanaka et al., "A Visual Retrieval System with Private Information for Image Database," Proceeding International Conference on DSP Applications and Technology, Oct. 1991, pp. 415-421.

Tanaka et al., "New Integrated Coding Schemes for Computer-Aided Facsimile," Proc. IEEE Int'l Conf. on Sys. Integration, Apr. 1990, pp. 275-281.

Thomas Keith, Screening Technology for Content from Compact Discs, May 24, 1999, 11 pages.

Tirkel et al, "Electronic Water Mark," DICTA-93, Macquarie University, Sydney, Australia, Dec., 1993, pp. 666-673.

Vidal et al., "Non-Noticeable Information Embedding in Color Images: Marking and Detection", IEEE 1999, pp. 293-297.

Weber et al., "Correlative Image Registration," Seminars in Nuclear Medicine, vol. XXIV, No. 4, Oct., 1994, pp. 311-323.

Winograd, J.M., "Audio Watermarking Architecture for Secure Digital Music Distribution," a Proposal to the SDMI Portable Devices Working Group, by Aris Technologies, Inc., Mar. 26, 1999.

* cited by examiner

METHOD AND APPARATUS FOR ENCODING PAPER WITH INFORMATION

RELATED APPLICATION DATA

This application is a continuation of Ser. No. 09/515,545 (now U.S. Pat. No. 6,608,919), filed Feb. 29, 2000, which is a continuation-in-part of application Ser. No. 09/437,357 (now abandoned), filed Nov. 10, 1999.

FIELD OF THE INVENTION

The present invention relates to paper-making, and more particularly relates to techniques useful in encoding information in paper during its formation.

BACKGROUND AND SUMMARY OF THE INVENTION

Digital watermarking is a burgeoning science with an extensive literature. Some of it, by the present assignee, relates to texturing the surface of a paper to convey optically-detectable digital information.

The assignee's U.S. Pat. No. 5,850,481, for example, details how the microtopology of a paper can be shaped, e.g., by a Braille-like machine, to encode digital data. The assignee's application Ser. No. 09/127,502 (now U.S. Pat. No. 6,345,104) details how the high-pressures used in intaglio printing can be used to similar effect.

In accordance with a preferred embodiment of the invention, paper is textured during the paper-making process, rather than in a subsequent process, thereby affording various advantages. The texture yields a known signature when transformed to the frequency domain. This signature can be used for various purposes, including determining the angular orientation of the paper when scanned and analyzed for the presence of watermark data, and for simple document recognition purposes (e.g., photocopiers that refuse to reproduce banknotes). One way of effecting the desired texturing is by shaping the surface of a de-watering element accordingly.

The foregoing and additional features of the present invention will be more readily apparent from the following detailed description, which proceeds with reference to the accompanying drawings.

DETAILED DESCRIPTION

Figure 1:
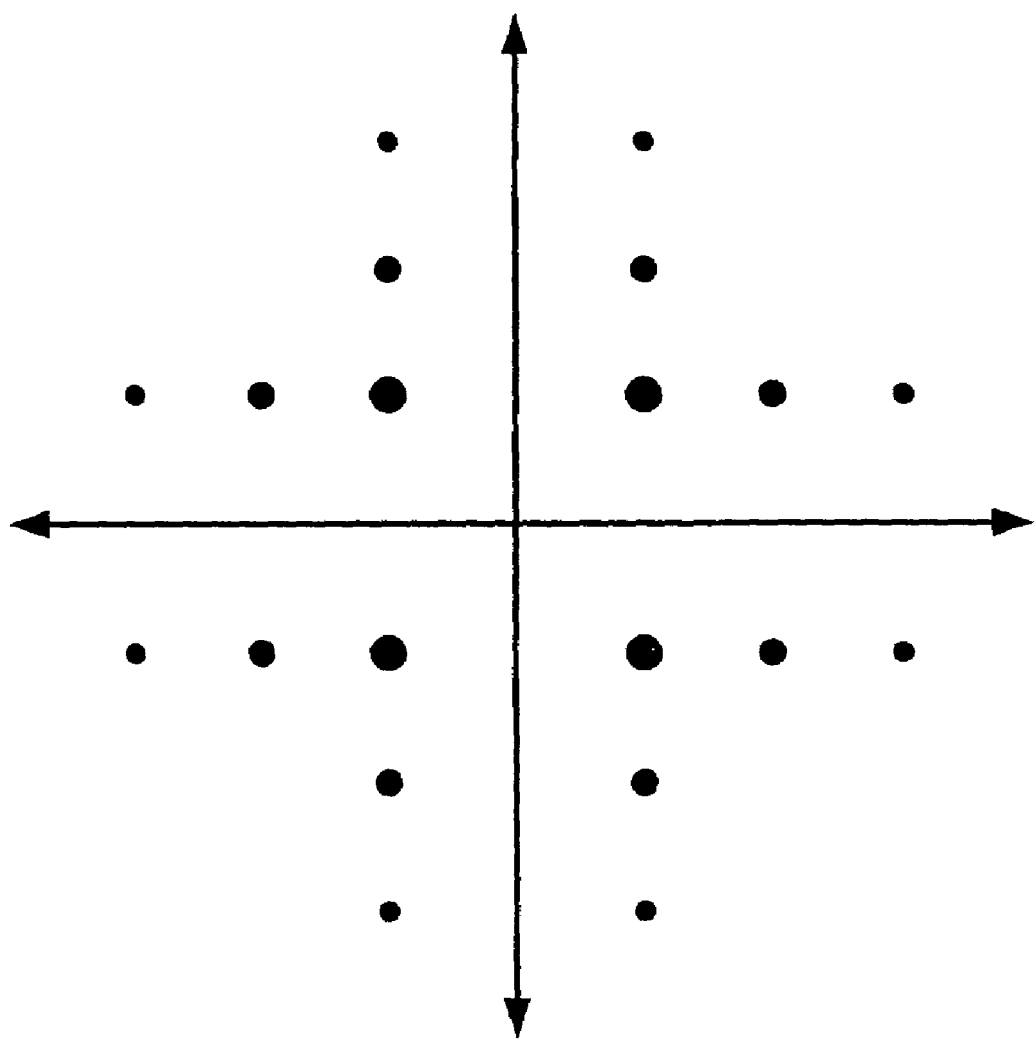
FIG. 1 shows the frequency spectrum attributed to surface texture of a banknote paper.

On optical scanning of an existing banknote, it was found that that the image data had components that were not attributable to the artwork printed on the note. Rather, further examination found that texturing left during the paper-making process had a pattern that appeared —when transformed into the frequency domain by a FFT process— as a well defined array of spectral impulses (FIG. 1). This spectrum of this particular note had the appearance of a 2-dimensional sampled sync function. (The size of the points in FIG. 1 signifies amplitude of the corresponding frequency component; each is an impulse.)

In the digital watermarking field, subliminal frequency domain patterns are sometimes deliberately inserted into images to serve as calibration signals by which scale, rotation, and offset can be computer-determined. (See, e.g., the assignee's U.S. Pat. No. 5,862,260.) Instead of adding such a pattern during printing, the patterns formed during paper-making might alternatively be used.

In accordance with one embodiment of the present invention, the printing on a paper is oriented so as to align in a predetermined manner with the texture markings on the paper surface. For example, the printing process can be tightly integrated with the paper-making process so that the orientation of the printing applied to the paper coincides in the desired manner with the paper texture. In a related embodiment, the paper-making and printing processes are not tightly integrated, but the paper is formed or cut so that its edges correspond in a known relationship to the texture pattern on the paper surface. By such arrangement, careful alignment of the paper's edge with a reference during later printing can assure that the image is oriented in the desired manner with the substrate texture. In still another embodiment, the paper is scanned just before printing, and the resulting data is processed so as to determine orientation of the texture signal. Printing is then oriented relative to the paper in the desired manner.

When a document printed by such a technique is thereafter placed on the platen of a scanner and scanned, the resulting image data is of uncertain rotation. The scan data can be converted to a frequency domain (e.g., by the FFT), and the known frequency pattern due to the paper texture can then be used as a calibration signal permitting the rotational state of the image data to be determined. Decoding of the watermark can then proceed once the rotation is known. (In some watermarking systems, scale and/or offset may also need to be determined. However, their determination is facilitated by knowledge of rotation. Moreover, the frequency domain signal may result in some ambiguity in the document orientation, e.g., rotations beyond 180 degrees may appear as rotations in the range 0–180 degrees. Such cases can be resolved through other means.)

As is familiar to those skilled in the art, paper is typically formed by depositing a layer of pulp slurry on a planar or cylindrical surface, extracting the water from the pulp, and drying. The middle step, sometimes known as de-watering, can be performed using various structures. Porous ceramic rollers are used in some processes, with a vacuum applied to the inside of the roller that serves to draw water away from the wet layer, through the pores, and to the inside of the roller. Other processes involve meshes or screens through which water is drawn from the pulp. The surfaces of such de-watering structures can be textured to impart a complementary texture (and a corresponding frequency-domain signal) to the paper.

In particular, a desired frequency domain signal can first be defined. The signal can be comprised of one or more impulses in the frequency domain, or can be spread across the spectrum. (The signal shown in FIG. 29A of U.S. Pat. No. 5,862,260 is exemplary of a suitable signal.) This signal is then inverse—transformed into the spatial domain, and the de-watering element then shaped in accordance with the resulting pattern.

In many embodiments, the frequency domain signal is manifested as a fine continuous "weave"-like pattern in the spatial domain. In other embodiments, pseudo-random patterns can be used. If desired, certain discrete markings in the spatial domain can also be provided on the de-watering element surface to provide additional functionality in the texture signal (e.g., permitting image translation to be determined in addition to image rotation).

In other embodiments, the frequency domain signal effected by the texturing does not serve as a calibration adjunct to another signal (e.g., a watermark signal). Rather, the frequency domain signal is employed alone. One application is in simple document recognition. For example, a photocopier may be arranged to look for the frequency domain signature characteristic of the texturing associated with banknote paper and, if detected on a document-to-be-copied, refuse to copy. (An example of another banknote sensing photocopier, albeit one that looks for a pattern in the printing on the document rather than in the paper texture, is shown in Canon's U.S. Pat. No. 5,583,614.) The texturing may be arbitrarily complex so as to reduce false triggering of such a detector.

In still other embodiments, the texturing can convey a plural-bit watermark payload. For example, the presence or absence of different frequency-domain components can signal "1" or "0" bits. Many other such arrangements will be apparent.

To provide a comprehensive disclosure without unduly lengthening this specification, applicant incorporates by reference the patents and applications cited above.

Having described an illustrated the principles of my invention with reference to specific embodiments, it will be recognized that the principles thereof can be implemented in many other, different, forms. For example, while the detailed embodiment discussed use of the FFT transform, the patterns formed during paper-making can likewise be discerned in other transform domains. Similarly, while a de-watering element was particularly noted as suitable for texturing, other elements in a paper-making apparatus can be alternatively be textured with similar effect. Still further, while the invention was illustrated with reference to conventional "paper," the principles thereof are equally applicable to other printable media, including plastic and the material marketed by DuPont under the brand name Tyvek. Yet further, while the illustrated embodiment textured the paper during its formation, post-formation texturing—as detailed in the assignee's other patents/applications—can be used in the particular applications above-detailed (e.g., to determine image rotation, for simple document recognition, etc.).

Moreover, the particular combinations of elements and features in the above-detailed embodiments are exemplary only; the interchanging and substitution of these teachings with other teachings in this and the incorporated-by-reference patents/applications are also contemplated.

I claim:

1. A method of marking a paper document comprising:
   receiving a first signal comprising plural encoded bits of data;
   receiving a second signal comprising an orientation component, the orientation component corresponding to a predetermined frequency domain orientation component; and
   in a paper document production process, including a step that imparts into a surface topology of the paper document the first signal and the second signal to thereby steganographically mark the paper document.

2. The method of claim 1, wherein the orientation component comprises plural impulses.

3. A method of marking a paper document comprising acts of:
   receiving a signal comprising plural bits of data and an orientation component, the orientation component having characteristics observable in at least one transform domain; and
   imparting into a surface topology of a paper document a representation of the signal to thereby steganographically mark the paper document, wherein the representation of the signal is machine-readable from optical scan data representing at least a portion of the paper document.

4. The method of claim 3 wherein the transform domain comprises a frequency domain.

5. The method of claim 3 wherein the paper document comprises a synthetic.

6. The method of claim 3 wherein said imparting utilizes a de-watering element.

7. A method of marking a document comprising acts of:
   receiving a plural-component signal, wherein at least one component of the plural-component signal has characteristics that are observable in at least one transform domain; and
   shaping a surface of a document in accordance with the plural-component signal to thereby steganographically mark the document, wherein the plural-component signal is machine-readable from optical scan data representing at least a portion of the document.

8. The method of claim 7 wherein the transform domain comprises a frequency domain.

9. The method of claim 7 wherein the document comprises a synthetic.

10. The method of claim 7 wherein said shaping utilizes a de-watering element.

11. The method of claim 7 wherein the plural-component signal comprises a plural-bit message.

12. The method of claim 7 wherein the plural-component signal comprises an orientation component.

\* \* \* \* \*